United States Patent [19]

Koblitz et al.

[11] Patent Number: 5,381,329
[45] Date of Patent: Jan. 10, 1995

[54] SWITCH MODE POWER SUPPLY FOR A TELEVISION RECEIVER AND METHOD OF CONTROLLING THEREFOR

[75] Inventors: Rudolf Koblitz, Meylan, France; Steffen Lehr, VS-Marbach; Franz Dieterle, Schiltach, both of Germany

[73] Assignee: Deutsche Thomson-Brandt GmbH, Villingen-Schwenningen, Germany

[21] Appl. No.: 26,052

[22] Filed: Mar. 4, 1993

[30] Foreign Application Priority Data

Jul. 10, 1990 [DE] Germany .................. 4021940

[51] Int. Cl.⁶ .................. H02M 3/24; H04N 5/63
[52] U.S. Cl. .................. 363/49; 363/97; 348/730
[58] Field of Search .................. 363/16, 18, 19, 49, 363/97; 358/190; 315/411

[56] References Cited

U.S. PATENT DOCUMENTS

| | | | |
|---|---|---|---|
| 4,209,826 | 6/1980 | Priegnitz | 363/21 |
| 4,761,723 | 8/1988 | Lendaro | 363/49 |
| 4,868,662 | 9/1989 | Hartman et al. | 358/190 |
| 4,937,728 | 6/1990 | Leonardi | 363/97 |
| 4,941,078 | 7/1990 | Leonardi | 363/97 |

FOREIGN PATENT DOCUMENTS 0291742 11/1988 European Pat. Off. .... H02M 3/335
2651196 11/1976 Germany .................. H02P 13/22

OTHER PUBLICATIONS

IEEE Transactions on Consumer Electronics, vol. 36, No. 1, Feb. 1990, P. Maige et al., "A universal power supplyintegrated circuit for TV and monitor applications", pp. 10–17.

*Primary Examiner*—Kristine L. Peckman
*Assistant Examiner*—Matthew Nguyan
*Attorney, Agent, or Firm*—Joseph S. Tripoli; Eric P. Herrmann; Daniel E. Sragow

[57] ABSTRACT

A method of controlling the switching transistor in the switch mode power supply of a television receiver includes the steps of selectively operating the transistor in a stand-by state, a start-up state and an ON-state. During the stand-by state the switching transistor is rendered conductive by applying bursts of pulses at a frequency above, and unsynchronized with, the line frequency of the television receiver. The pulses are separated by changing intervals. During the start-up state the frequency of said bursts of the pulses is continuously reduced and pulses and the duration of the on time of the transistor is determined using a regulation voltage. During the ON-state, line synchronizing pulses are applied and the switching transistor is regulated to the line frequency.

7 Claims, 2 Drawing Sheets

SWITCH MODE POWER SUPPLY FOR A TELEVISION RECEIVER AND METHOD OF CONTROLLING THEREFOR

This is a Continuation of PCT Application PCT/EP 91/01260 filed Jul. 5, 1991 by Rudolf Koblitz, Steffen Lehr and Franz Dieterle and titled COMBINATORIAL CIRCUIT COMPONENT FOR A TELEVISION RECEIVER.

BACKGROUND OF INVENTION

This invention is directed to a switch mode power supply for a television receiver. When a switch mode power supply is in a stand-by mode, only a small amount of power is transmitted, that is the switching transistor is periodically electrically driven to be conducting by groups of pulses, i.e. a burst operation. After the television receiver is turned on, an initial, or start-up, mode of operation is initiated which triggers the transition from the stand-by mode to an ON mode. In the ON mode, the power transmitted is raised to the rated value by increasing the operating (on) time of the switching transistor. At the transition from the stand-by mode to the ON mode, which occurs during the start-up operation, there is the danger that, due to unexpected occurrences the switching transistor, is subjected to significant voltages and currents which can damage the transistor.

SUMMARY OF INVENTION

It is an object of the invention to provide a switch mode power supply in which the switching transistor is not in danger during the transition from the stand-by mode to the ON mode, which takes place during the start-up mode operation.

With the invention, a defined, controlled starting phase is created to remove all danger to the switching transistor caused by a power loss which is too great. The expenditure for the circuitry in this case is small because the circuit for generating the controlled starting phase can be built in the form of an integrated circuit (IC).

DESCRIPTION OF THE DRAWINGS

The invention is described with reference to the drawings, in which.

DETAILED DESCRIPTION OF THE INVENTION

Figure 1:
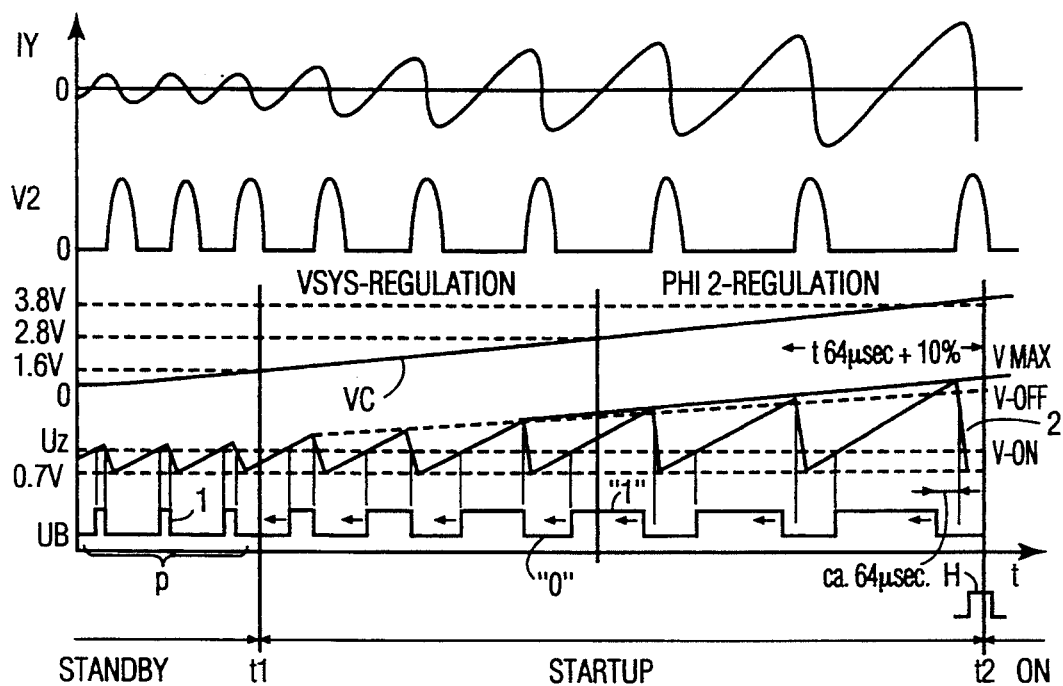
FIG. 1 shows diagrams explaining the operation of the invention.
Figure 3:
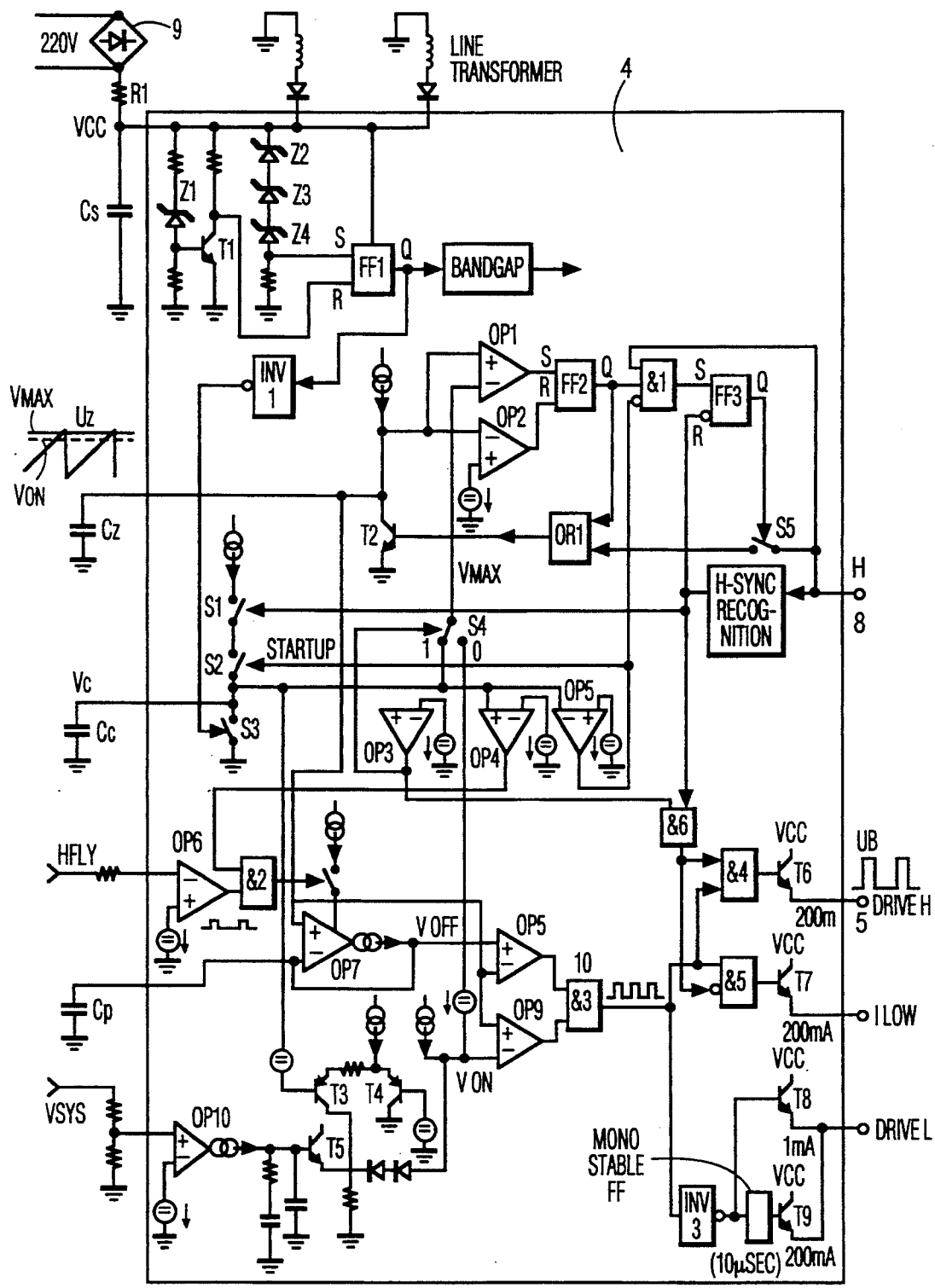
FIG. 3 is a preferred embodiment.

FIG. 1 shows the current Iy which flows through the primary winding of the transformer for the switch mode power supply 4, shown in FIG. 3. The transformer is coupled in series with the switching transistor T1 to the operating voltage. In FIG. 1 voltage V2 represents the flyback pulses occasioned by Iy upon each switch-off of the switching transistor T1. During the stand-by mode prior to time t1, the switching transistor is periodically electrically controlled to be conducting by the voltage UB from bursts P of short pulses 1 of approximately 3 microseconds duration. The length of the period of pulses 1 is approximately 28 microseconds, which corresponds to about twice the line frequency 2fH. There are intervals between the individual bursts P of pulses 1 during which the switching transistor remains blocked. The duration of the bursts P is selected such that in the stand-by mode, only the small amount of power required for stand-by, about 1 to 5 Watts, is transmitted. The pulses 1 are generated from the sawtooth voltage Uz, which has the same frequency as current Iy and voltage V2, by means of a threshold value circuit with the threshold values V-ON and V-OFF. Every time V-ON is exceeded the voltage UB at the base of the switching transistor assumes the value "1" and the switching transistor is driven conducting. Every time the voltage falls below V-OFF then UB goes to the value "0" and the switching transistor is blocked. Such a circuit for stand-by mode is described in more detail in the earlier Patent Application P 40 14 833.

At time t1 the television receiver is switched on, e.g. by a remote control. At t1 the line synchronizing pulses of the received television signal appear in the circuit. When the line synchronizing pulses appear the voltage Vc, which increases continuously from t1, is generated. Vc changes the amplitude and frequency of voltage Uz in such a manner that the duration of periods of UB is slowly raised and consequently, the frequency is reduced. In doing this, the on time of the switching transistor, represented by the value "1" for UB, increases continuously, while the moment for switching off initially remains the same. The dropping frequency of UB therefore changes in the direction of the line frequency of the received signal, i.e. a period duration of 64 microseconds. Up until this point, the circuit is not synchronized by the line synchronizing pulses. After the voltage Vc has exceeded a certain threshold, two regulation loops determine the threshold voltages V-ON and V-OFF. The moment for switching on UB (represented by the voltage V-ON) is determined by the regulation of the system voltage VSYS. The moment for switching off (represented by the voltage V-OFF) is determined by a PHI2 regulation.

At time t2 the duration of the period of UB exceeds the duration period of the received signal by approximately 10 percent. At this moment the received line synchronizing pulse H coincides with the falling edge of Uz. This is the condition for the synchronization of the circuit to the line frequency of the received signal. At the same time, regulating circuits are working to stabilize the operating voltages generated. The circuit now works in normal, or ON mode. From time t2 onwards, the duration of periods of the voltage UB is continuously synchronized with the line frequency of the received signal, i.e. to a line length of 64 microseconds.

Figure 2:
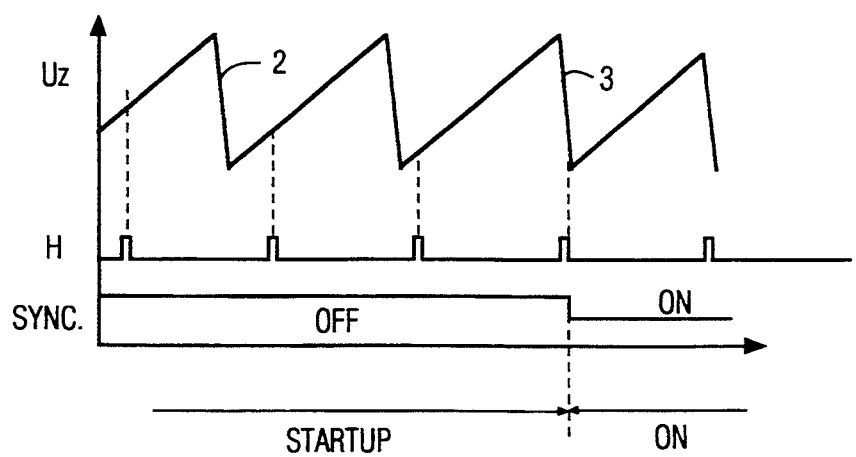
FIG. 2 is a supplement to FIG. 1.

FIG. 2 illustrates the approach of the ON mode shortly before time t2. At first, the line synchronizing impulses H do not coincide with a falling edge 2 of Uz. The synchronization of the circuit therefore remains switched off. At t2 the coinciding of the falling edge 3 of Uz with the line synchronizing pulse H1 is established. Thereupon, the synchronizing of the circuit to the line frequency, and consequently the fixed ON mode, is switched on.

FIG. 3 shows an integrated circuit 4 which generates the voltage UB at the terminal 5 for the switching transistor T1 of the switch mode power supply in the manner described for stand-by, start-up, and ON modes. The terminal 5 is connected via known driver circuits and bias voltage networks to the base of the switching transistor T1 of the switch mode power supply, and periodically controls the transistor into conducting or blocked (non-conducting) states. The switching transistor is located in series with the primary winding of the transformer for the switch mode power supply between the operating voltage VCC and ground. The voltage Vc is available at the capacitor Cc. The line synchronizing impulses H with frequency fH are fed to the circuit via the terminal 8. The operating voltage VCC for the switch mode power supply is generated from the main supply voltage at the capacitor Cc using the rectifier 9. The circuit 4 has several operating states as follows; OFF, transition from OFF to stand-by, stand-by, and start-up.

In the OFF state no voltage is applied. This is the completely static condition without voltages and currents.

In the transition from the OFF state to the stand-by state, when the main voltage is switched on the charging capacitor Cs is charged by the main rectifier 9 via resistor R1. The output terminals of circuit IC4 remain inactive during this. Only when the voltage VCC has exceeded the breakdown voltage from Z2 to Z4 can the BANDGAP be put into operation via the flip-flop FF1. The STAND-BY state is then reached.

In the STAND-BY state, when the flip-flop FF1 is set the switch S3 is also open. If no H-SYNC signal H is applied to terminal 8 switch S1 remains open and capacitor Cc, at which the voltage Vc is available, cannot be charged. The switch S2 is closed at this time. Transistor T3 is conducting because capacitor Cc is discharged. The current flowing through transistor T3 is determined by a current source and generates the voltages V-ON and V-MAX. The voltage V-MAX is sent via switch S4 to the sawtooth oscillator and there determines the maximum voltage of the sawtooth Uz. The oscillator functions in the following manner. Capacitor Cz is charged using a current source. If the voltage at Cz reaches the voltage V-MAX then flip-flop FF2 is set and Cz is discharged via transistor T2. The discharging is stopped if the sawtooth voltage Uz drops below 0.7 V. Then amplifier OP2 supplies the reset signal for FF2. A square-shaped signal is generated from this sawtooth voltage using OP8 and OP9. Using a voltage sensor of known type it is ascertained that the voltage on capacitor Cp is greater than V-MAX. Therefore, only V-ON determines the pulse width of the square-wave pulse at the output of the AND-gate 10 in the STAND-BY state. The pulse width is approximately 3 microseconds at a period duration of 28 microseconds. This square-wave pulse controls the output stage. In the stand-by state the outputs I LOW and DRIVE L are active. They control the triggering of the power transistor for the switch mode power supply. If H-SYNC signals are applied to the terminal 8 then the circuit switches to START-UP state. The burst mode in STAND-BY in the form of the bursts P shown in FIG. 1 has not been considered here in order to keep the circuit clear.

In the START-UP state the synchronizing signals H are recognized and switch S1 is closed. Capacitor Cz is charged via a current source. As long as the voltage at Cz remains below 1.6 V there are no changes to the output voltages from the STAND-BY state. When the voltage at Cz exceeds 1.6 V then V-MAX is determined by the voltage at Cz because switch S4 switches over. As a result, due to the voltage V-ON which is still unaltered, the pulse width for the square-wave pulses at the output of the AND-gate 10 increases. Likewise, the output I LOW is switched off and replaced by DRIVE H. If the voltage at Cz exceeds 2.8 V then the PHI2 regulation is activated.

The HFLY pulse has the configuration shown in FIG. 3. Amplifier OP7 is only supplied with current when the negative pulses of this signal appear. At this time, amplifier OP7 compares the sawtooth voltage and the voltage at capacitor Cp. The voltage at Cp then achieves equilibrium when the falling edge of the sawtooth Uz coincides with the center of the negative HFLY pulse. The voltage at Cp is designated by V-OFF and determines the switch-off time of the square-wave pulse. In the lined-up condition, the falling edge of the square-shaped signal arrives about 10 microseconds earlier than the falling edge of the sawtooth Uz. Thereby, the appearance of a subsequent switch-on of the power transistor during the line flyback can be prevented, and the greatest possible range of control for the switch-on time of the power transistor achieved. The regulation of the system voltage VSYS starts to operate at about this time. With an increasing voltage at capacitor Cc, transistor T4 becomes more conductive and the VSYS regulation takes over the regulation of the voltage V ON. In FIG. 1, for reasons of clarity, the start of the VSYS regulation is drawn in immediately after the time t1. Following a voltage division, VSYS is compared with a reference voltage. The current output of the amplifier OP10 generates a voltage at the base of transistor T5 which then affects the voltage V ON and is responsible for the time of the rising edge of the square-wave pulse. The VSYS regulation controls the power transmission of the line transformer. When the voltage at capacitor Cc exceeds 3.8 V the START-UP procedure is switched off. Switch S2 is opened and prevents further charging of Cc. The flip-flop FF3 can be set when an H-SYNC pulse and the dropping edge of the sawtooth appear simultaneously. Thereby, the sawtooth oscillator is synchronized with the H-SYNC signal H. The circuit switches over to the ON state. At the end of the START-UP state, the length of the period of Uz is 10 percent longer than the period of the H-SYNC pulse H. It is thereby guaranteed that, in the ON state, the activation of transistor T2 is only triggered by the H-SYNC signals H.

We claim:

1. A method of controlling a switching transistor in a switch mode power supply of a television receiver whose display operates at line and field frequencies, comprising the steps of:

selectively rendering said transistor conductive and non-conductive in a stand-by state, a start-up state and an ON-state;

during said stand-by state, rendering said switching transistor conductive by applying bursts of pulses at a frequency above, and unsynchronized with, the line frequency of said television receiver, said pulses being separated by changing intervals;

during said start-up state, increasing the conduction time of said transistor and maintaining constant the non-conduction time, so as to reduce the frequency of said pulses, and determining the time of conduction of said transistor using a regulation voltage; and during said ON-state, applying line synchronizing pulses and regulating said switching transistor at said line frequency.

2. The method of claim 1 further including the step of generating a continuously increasing voltage at the beginning of said start-up state.

3. The method of claim 2 further including the step of controlling said switching transistor with a sawtooth voltage having a continuously increasing amplitude and period.

4. A switch mode power supply for a television receiver having a display operable at line and field frequencies, said receiver operable in a standby mode, a start-up mode, and an ON mode, comprising:
   a) a switching transistor which controls the power to said receiver;
   b) means for causing said transistor to be alternately conductive and non-conductive by generating pulses; said pulses being generated at a frequency above the line frequency during the standby mode,
   c) means for periodically interrupting the pulses during the standby mode, so as to produce bursts of pulses;
   d) means for increasing the width of said pulses during the start-up mode while maintaining constant the time between pulses, so as to reduce the pulse frequency, and
   e) means for synchronizing said pulses with said line frequency during said ON mode, and controlling the width of said pulses to regulate the power to said receiver.

5. The power supply according to claim 4, comprising means for initiating the start-up mode in response to synchronizing impulses.

6. The power supply according to claim 4, comprising means for initiating the ON mode in response to coincidence of a line synchronizing pulse with switching of said transistor.

7. The power supply according to claim 4, comprising means for controlling the duration of the bursts of pulses in the stand-by mode for regulating the stand-by power to the television receiver.

* * * * *